3,527,850
PHENYL DIALKYL PHOSPHINATES
Kenneth L. McHugh, Kirkwood, and Kurt A. Nowotny, Rock Hill, Mo., assignors to Monsanto Company, St. Louis, Mo., a corporation of Delaware
No Drawing. Original application Mar. 31, 1965, Ser. No. 444,406, now Patent No. 3,383,318. Divided and this application Nov. 20, 1967, Ser. No. 708,739
Int. Cl. C07f 9/12; C09k 3/00
U.S. Cl. 260—961                              7 Claims

ABSTRACT OF THE DISCLOSURE

Compounds particularly useful as functional fluids and lubricants which are represented by the formula

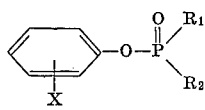

wherein $R_1$ and $R_2$ are each alkyl radicals having from 3 to 6 carbon atoms, X is selected from the group consisting of hydrogen, alkyl and alkoxy radicals having from 1 to 8 carbon atoms, and the halogens.

---

This application is a division of application Ser. No. 444,406 filed Mar. 31, 1965, now U.S. Pat. 3,383,318.

This application relates to novel functional fluids comprising certain esters of phosphinic acid.

Many different types of materials are utilized as functional fluids and functional fluids are used in many different types of applications. Such fluids have been used as electronic coolants, atomic reactor coolants, diffusion pump fluids, synthetic lubricants, damping fluids, bases for greases, force transmission fluids (hydraulic fluids) and as filter mediums for air conditioning systems. Because of the wide variety of applications and the varied conditions under which functional fluids are utilized, the properties desired in a good functional fluid necessarily vary with the particular application in which it is to be utilized. Each individual application requires a functional fluid having a specific class of properties.

Of the foregoing, the use of functional fluids as hydraulic fluids, particularly aircraft hydraulic fluids, has posed what is probably the most difficult area of application. Thus, up to a few years ago the requirements for an aircraft hydraulic fluid could be described as follows:

The hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly nonflammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Such temperature range is generally from —40° F. to 450° F. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, etc. employed in the hydraulic systems of aircraft which are exceedingly severe on the fluid used. It should be thermally and chemically stable in order to resist oxidation and decomposition so that it will remain uniform under conditions of use and be able to resist the loss of desired characteristics due to high and sudden changes of pressure and temperature, high shearing stresses, and contact with various metals which may be, for example, aluminum, bronze, copper and steel. It should also not deteriorate the gaskets or packings of the hydraulic system. It must not adversely affect the materials of which the system is constructed, and in the event of a leak, should not adversely affect the various parts of the airplane with which it may accidentally come in contact, such as electrical wire insulation and paint. It should not be toxic or harmful to personnel who may come in contact with it.

While the above-stated requirements are stringent, the development of industry in general and air transportation in particular has rendered these old requirements and specifications inadequate for present and future needs. Industrial automation has increased the importance of fire resistance in hydraulic fluids. The air transportation industry has been developing new concepts of aircraft design at a rapid pace. The increased size and speed of aircrafts have made necessary extended horsepower demands for aircraft motive power units and associated hydraulic control systems thus increasing working temperature ranges and operating pressures. As the speed of commercial aircraft approach and surpass that of sound, operating temperatures are incurred which require the designers to take advantage of all heat dissipating techniques available in the craft. Surface temperatures of a Mach 3 aircraft will range from 450° F. to 600° F. or higher at stagnation points. By taking advantage of natural heat sinks, such as the fuel in a manner utilized in the B-70, the hydraulic system should be capable of performing with a fluid operating at 400° F. to 500° F. On the other end of the temperature scale, temperatures as low as —40° F. are anticipated.

The Commercial Jet Hydraulics Panel of SAE A6, which was initiated during 1961 for the purpose of investigating and making recommendations for corrections of current fire resistant jet hydraulic systems, found that ⅔ of all hydraulic system incidents during a 1½-year period prior to June 1962 were due to external system leakage, largely from components such as lines, fittings, hoses and seals. This leakage problem was considered by the panel and industry in general to be a very undesirable situation from the standpoint of loss of powered control. In the supersonic aircraft any leakage problems would be magnified excessively over and above the loss of powered control when one considers the temperatures involved. In this case, there is no longer the situation in which leakage fluid will issue into relatively cold areas but rather into ambient temperatures as high as 600° F. It is apparent that a flammable fluid injected into hot compartments would create a blow torch effect, an untenable condition. A fire-resistant fluid is thus of greater importance than ever before.

The principal problem facing a fluid supplier, therefore, is that of developing a hydraulic fluid having temperature compatibility to approximately 400° F. to 500° F. combined with fire-resistance. In addition to the foregoing the hydraulic fluid must still have the properties mentioned above, including good viscosity characteristics (over a quite extended temperature range), a low freezing point, low volatility, sufficient lubricity, no toxicity and compatibility with various metals, packings and gaskets.

It is, therefore, an object of this invention to provide functional fluid compositions having a combination of properties, such as wide liquid range and fire-resistance, which makes such compositions well suited for the various applications mentioned above. It is a further object of this invention to provide functional fluid compositions which are useful as hydraulic fluids, particularly aircraft hydraulic fluids. A further object is to provide functional fluids useful as hydraulic fluids in supersonic aircraft. Other objects will be apparent from the following description of the invention.

It has now been found that functional fluids having excellent fire-resistance coupled with the physical properties necessary to provide compositions useful for the many applications disclosed above and particularly as aircraft hydraulic fluids comprise certain aryl dialkyl phosphinate esters which can be represented by the structural formula:

I 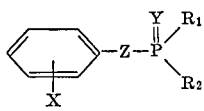

wherein Y and Z are each selected from the group consisting of oxygen and sulfur, $R_1$ and $R_2$ are each alkyl radicals having from 3 to 6 carbon atoms, X is selected from the group consisting of hydrogen, alkyl and alkoxy radicals having from 1 to 8 carbon atoms, and the halogens. Functional fluids comprising mixtures of compounds represented by structure I are also intended to be within the scope of this invention.

Also within the broad aspects of this invention, there is provided novel functional fluids comprising a compound or mixture of compounds of structure I above in admixture with blending agents or mixtures of blending agents which can be represented by the structural formula II 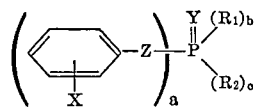

wherein Z, Y, $R_1$, $R_2$ and X have their aforedescribed significance and a, b and c are integers from 0 to 3 and the sum of a, b and c is 3.

Typical examples of aryl dialkyl phosphinate esters of structure I are as follow:

phenyl-di-n-propyl phosphinate,
phenyl-di-n-butyl phosphinate,
phenyl-di-sec-butyl phosphinate,
phenyl-di-n-pentyl phosphinate,
phenyl-di-neopentyl phosphinate,
phenyl-di-n-hexyl phosphinate,
phenyl-di-n-butyl thiophosphinate,
p-methoxyphenyl-di-n-butyl phosphinate,
m-chlorophenyl-di-n-butyl phosphinate,
phenyl-(n-propyl-n-pentyl) phosphinate,
phenyl-(n-propyl-n-butyl) phosphinate,
phenyl-(n-propyl-n-hexyl) phosphinate,
phenyl-(n-butyl-n-pentyl) phosphinate,
phenyl-(n-butyl-n-hexyl) phosphinate,
phenyl-(n-pentyl-n-hexyl) phosphinate,
phenyl-(neopentyl-n-propyl) phosphinate,
phenyl-(neopentyl-n-butyl) phosphinate,
phenyl-(neopentyl-n-hexyl) phosphinate,
thiophenyl-di-n-propyl phosphinate,
thiophenyl-di-n-pentyl phosphinate,
cresyl-di-n-pentyl phosphinate,
tert.-butylphenyl-di-n-butyl phosphinate,
n-butylphenyl-di-n-butyl phosphinate,
sec.-butylphenyl-di-n-butyl phosphinate,
ethylphenyl-di-n-butyl phosphinate,
xylyl-di-n-butyl phosphinate,
thiophenyl-di-n-hexyl phosphinate,
thiophenyl-di-n-butyl phosphinate,
thiophenyl-di-n-propyl thiophosphinate,
thiophenyl-di-n-butyl thiophosphinate,
thiophenyl-di-n-pentyl thiophosphinate,
thiophenyl-di-n-hexyl thiophosphinate,
thiophenyl-(n-propyl-n-butyl) phosphinate,
thiophenyl-(n-propyl-n-pentyl) phosphinate,
thiophenyl-(n-propyl-n-hexyl) phosphinate,
thiophenyl-(n-butyl-n-pentyl) phosphinate,
thiophenyl-(n-butyl-n-hexyl) phosphinate,
thiophenyl-(n-pentyl-n-hexyl) phosphinate,
thiophenyl-(n-propyl-n-butyl) thiophosphinate,
thiophenyl-(n-propyl-n-pentyl) thiophosphinate,
thiophenyl-(n-propyl-n-hexyl) thiophosphinate,
thiophenyl-(n-butyl-n-pentyl) thiophosphinate,
thiophenyl-(n-butyl-n-hexyl) thiophosphinate, and
thiophenyl-(n-pentyl-n-hexyl) thiophosphinate.

Typical examples of the compounds of structure II are as follows:

tris-n-butyl phosphine oxide,
tris-n-propyl phosphine oxide,
tris-n-pentyl phosphine oxide,
tris-n-hexyl phosphine oxide,
diphenyl-n-propyl phosphonate,
diphenyl-n-butyl phosphonate,
diphenyl-n-pentyl phosphonate,
diphenyl-n-hexyl phosphonate,
triphenyl phosphate, and
tricresyl phosphate.

As used herein the term "major amount" of a base stock means that the amount of a particular base stock in a specific formulation is at least equal to the amount of any particular blending agent in said formulation. On the other hand the term "minor amount" of a blending agent means that the amount of a particular blending agent in a specific formulation is no more than the amount of any specific base stock in said formulation.

Although the compounds of structure I are useful per se as functional fluids, it is preferred to employ said esters as the major amount of a composition wherein a compound of structure II or a mixture of such compounds are present in minor amounts. Such compositions preferably contain from about 60% to about 85% of a compound of structure I above. Specifically, a preferred composition of this invention contains from about 60% to about 85% aryl dialkyl phosphinate, from about 5% to about 20% trialkyl phosphine oxide and from about 5% to about 20% diaryl alkyl phosphonate.

The above-mentioned blended compositions can be prepared by simply adding specific quantities of compounds of structure II to a phosphinic ester of structure I. It has been discovered, however, that compositions of the type herein described can be prepared directly by reacting an aryl phosphorochloridate, represented by the structure

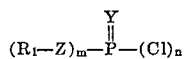

wherein $R_1$ is aryl, Y and Z are selected from the group consisting of oxygen and sulfur and m and n are integers from 1 to 2 and the sum of m+n is 3, with Grignard reagents if (a) the Grignard reagent is of the type $R_2MX$, where $R_2$ is alkyl, M is magnesium, aluminum or lithium and X is chlorine or bromine, and (b) such Grignard reagent is added to the aryl phosphorochloridate. The reaction product is a composition containing a major amount of a compound of structure I and minor amounts of compounds of structure II in the range of their respective preferred amounts as indicated above.

The following examples illustrate the method of obtaining directly the preferred compositions of this invention, in which parts are parts by weight and the reactor used is a conventional glass reactor fitted with an agitator, a reflux condenser, raw material inlet, product outlet, heating means and thermometer.

EXAMPLE 1

A reactor as heretofore described is charged with 422 parts of phenylphosphorodichloridate in 500 parts of ether. With the agitator running 645.4 parts of n-butyl-magnesium bromide is slowly (dropwise) added over a period of one hour. An exothermic reaction is noted and the reaction mixture is cooled to room temperature. The reaction mixture is then acidified with 10% sulfuric acid and the resulting ether layer separated. The ether layer is then washed with 10% sulfuric acid followed by additional washing with 10% sodium hydroxide. Washing is repeated with water until the washings are neutral. The ether is then evaporated yielding a composition containing by weight 60% O-phenyl dibutyl phosphinate, 20% tris-n-butyl phosphine oxide and 20% diphenyl-n-butyl phosphonate.

EXAMPLE 2

In the manner of Example 1, 467.6 parts of n-butylmagnesium chloride in ether is added to 422 parts of phenylphosphorodichloridate in ether. The reaction product is cooled, quenched and washed yielding a composition containing by weight 80% O-phenyl di-n-butyl phosphinate, 10% tris-n-butyl phosphine oxide and 10% diphenyl-n-butyl phosphonate.

EXAMPLE 3

In the manner of Example 1, 289.7 parts of n-hexylmagnesium chloride in ether is added to 211.0 parts of phenylphosphorodichloridate in ether. The reaction product is cooled, quenched and washed yielding a composition containing by weight 85% O-phenyl di-n-hexyl phosphinate, 7.5% tris-n-hexyl phosphine oxide and 7.5% diphenyl-n-hexyl phosphonate.

bath. The Dry Ice-acetone bath was maintained at a temperature in the range of −30° F. to −50° F., a range considered high enough to prevent a glass from forming and low enough to speed up potential crystallization. After a test composition had been agitated for about eight hours, seeds of one of the components were added. The seeded composition was then stored in a cold box at −50° F. for sixteen hours and then agitated in the Dry Ice-acetone bath for eight hours. The cycle was then repeated. Those mixtures which did not crystallize after one week were warmed to room temperature and transferred to small bottles with lids. The bottles were then placed in cold storage at −60° F.

The thermal stability of the components and compositions of this invention were determined by the use of an isoteniscope according to the procedure of Blake et al., J. Chem. Eng. Data, 6, 87 (1961). The basis for this procedure is that when a fluid is heated in the isoteniscope apparatus, it exerts a vapor pressure which can be readily measured. The vapor pressure increases as temperature is increased following a straight-line relationship when logarithm of pressure is plotted versus the reciprocal of the absolute temperature. The vapor pressure curve will depart from a straight line if decomposition occurs to give volatile products. The temperature at which this occurs is called the decomposition temperature ($T_D$).

Viscosity measurements were conducted under conditions set forth in ASTM O-445-61.

TABLE I

| Compound | Solution point, °F. | Boiling point, °F./mm. pressure | Thermal stability $T_D$ °F. | Viscosity | | |
|---|---|---|---|---|---|---|
| | | | | −40° F. | 100° F. | 210° F. |
| Phenyl-di-n-hexyl phosphinate | [2] <−20 | 155/0.2 | 528 | 5,520 | 12.58 | 2.63 |
| Phenyl-di-n-pentyl phosphinate | [2] <−10 | 162/0.5 | 534 | [1] 435 −5° F. | 10.70 | 2.31 |
| Phenyl-di-neopentyl phosphinate | [1] <−50 | 152/0.8 | 547 | 9,266 −10° F. | 18.62 | 3.01 |
| Phenyl-di-n-butyl phosphinate | [2] <−80 | 136/0.4 | 633 | 4,689 | 9.02 | 2.11 |
| Phenyl-di-sec-butyl-phosphinate | [2] <−45 | 123/0.1 | 586 | 5,596 −20° F. | 10.03 | 2.08 |
| Phenyl-n-propyl-n-pentyl phosphinate | [1] <−85 | 140–146/0.15 | 530 | 3,892 | 8.94 | 2.08 |
| Phenyl-di-n-propyl phosphinate | [1] <−85 | 145–147/2.0 | 599 | 4,301 | 7.43 | 1.83 |
| p-Methoxyphenyl-di-n-butyl phosphinate | | 164/0.3 | 564 | | | |
| p-Nitrophenyl-di-n-butyl phosphinate | | 182/0.2 | 536 | | | |
| Thiophenyl-di-n-butyl thiophosphinate | [1] <−40 | 129/0.25 | 514 | 7,248 0° F. | 29.51 | 3.39 |

[1] Crystallized at −10° F.
[2] Crystallizing point.

EXAMPLE 4

In the manner of Example 1, 785.5 parts of n-pentylmagnesium chloride in ether is added to 633 parts of phenylphosphorodichloridate in ether. The reaction product is cooled, quenched and washed yielding a composition containing by weight 82% O-phenyl di-n-pentyl phosphinate, 9% tris-n-pentyl phosphine oxide and 9% diphenyl-n-pentyl phosphonate.

The individual phosphinic acid esters of structure I produced according to the procedures illustrated in the above example can be easily obtained in pure form by fractional distillation of the reaction product under reduced pressure.

Typical properties of the above-prepared and other base stock compounds of this invention are set forth in Table I, below. The methods of obtaining these data are as follows:

The melting point of pure compounds or solution points of the compositions of this invention were measured. Because the compositions of the instant invention easily super-cool (as do the components) crystallizing points are difficult to determine. However, since solution point and crystallizing point coincide the solution point was generally measured.

Solution points were determined by placing a test composition in a test tube provided with an agitator and suspending the apparatus in a well insulated Dry Ice-acetone From the properties set forth in Table I above, it is evident that phosphinate ester base stock compounds have a combination of physical properties which make them well suited for use as functional fluids. These desirable physical properties are enhanced or improved by blending the novel phosphinate esters with minor amounts of compounds of structure II hereinbefore set forth. To demonstrate the fire-resistant property of the compositions of this invention a fluid consisting of 75% phenyl-di-n-butyl phosphinate, 12% tris-n-butyl phosphine oxide and 13% diphenyl-n-butyl phosphonate, hereinafter designated fluid A, was subjected to various empirical tests generally recognized as a true indication of fire resistance. A phosphate ester type fluid, commercially used and accepted as being fire resistant was also subjected to the aforementioned empirical tests and is hereinafter designated fluid B. The tests or procedures used to measure the fire-resistant properties of the fluid are as follows:

Hot Manifold Test _____ AMS 3150C
High Pressure Spray Test _____ AMS 3150C

An additional test often used, which is a smaller scale test, is the Molten-metal Pour Test. In this test the fluid under evaluation is dropped from a medicine dropper or poured from a calibrated test tube onto the surface of molten aluminum alloy which has been heated to about 1250° F. If spontaneous ignition does not occur, a flame is placed in the vapors to determine if they can be ignited. The results of these tests appear in Table II below.

system having a pump therein supplying the power for the system. In such a system, the parts which are so lubri-

TABLE II

| Compound | Molten-metal four test | High pressure spray test | Hot manifold test |
|---|---|---|---|
| Fluid A | Does not ignite spontaneously | Did not ignite up to 4 feet from orifice | Burned on the tube. |
| Do | Ignites with spark | Flashed with mild flame beyond 4 feet from orifice | Did not carry flame from tube. |
| Do | Burns to completion, large flame | Flame is not sustaining | Did not burn in pan. |
| Fluid B | Does not ignite spontaneously | Did not ignite up to 4 feet from orifice | Burned on the tube. |
| Do | Ignites with spark | Flashed with mild flame beyond 4 feet from orifice | Did not carry flame from tube. |
| Do | Burns to completion, large flame | Flame is not sustaining | Did not burn in pan. |

Compositions of this invention also possess good lubricating properties as evidenced by the results obtained from testing of such compositions on the Shell Four-ball Wear Test machine. The results are listed in Table III below.

TABLE III

[Test Conditions: 10 kg. load; 1,200 r.p.m. for 2 hours at the temperature indicated]

| Composition | Temperature, °F. | Scar diameter, mm. steel-on-steel |
|---|---|---|
| Fluid A | 167 | .60 |
| Do | 400 | 1.03 |
| Phenyl-di-n-butyl phosphinate | 400 | .92 |
| Phenyl-di-n-hexyl phosphinate | 400 | .64 |
| Phenyl-di-n-pentyl phosphinate | 400 | .70 |

In addition to the above the compositions of this invention are shear stable and are not prone to foaming and any foam formed is not stable. Furthermore, the claimed compositions have good stability, even at temperatures of 500° F. and in the presence of oxygen, and are essentially non-corrosive to metals, such as iron, silver and titanium. A further advantage of the instant compositions is their outstanding hydrolytic stability.

The compositions of this invention are useful as functional fluids over wide temperature ranges and in various applications, such as for force transmission fluids for the transmission of pressure, power or torque in fluid pressure or torque actuated mechanisms. Specific examples of such uses are the hydraulic fluids used to transmit fluid pressure to the ram cylinder of hydraulic presses, devices for the absorption and dissipation of energy, such as shock absorbers or recoil mechanisms or the transmission of torque through troque converter type fluid couplings. The compositions of this invention can also be used as damping fluids which are the liquid compositions used for damping mechanical vibrations or resisting other rapid mechanical movements. The compositions of this invention are also suitable for use as lubricants between relatively moving metal mechanical parts, as bases for synthetic greases, as nuclear reactor coolants, as vacuum pump fluids and as the liquid material in the filters of air conditioning systems. The instant compositions are particularly well suited for cooling and lubricating metal gears and bearings in jet engines.

As a result of the excellent physical properties of the functional fluids particularly described in the preceding examples, improved hydraulic pressure devices can be prepared in accordance with this invention which comprise in combination a fluid chamber and an actuating fluid in said chamber, said fluid comprising a mixture of one or more of the base stocks hereinbefore described. In such a hydraulic apparatus wherein a movable member is actuated by the above-described functional fluids, performance characteristics are obtainable which are superior to those heretofore obtainable.

Because of the excellent fire-resistance of the functional fluids of this invention, their exceptionally low pour points, and good lubricity, the functional fluids of this invention can be utilized in those hydraulic systems wherein power must be transmitted and the frictional parts of the system lubricated by the hydraulic fluid utilized. Thus, the novel functional fluids of this invention find utility in the transmission of power in a hydraulic system having a pump therein supplying the power for the system. In such a system, the parts which are so lubricated include the frictional surfaces of the source of power, namely the pump, valves, operating pistons and cylinders, fluid motors and in some cases, for machine tools, the ways, table and slides. The hydraulic system may be of either the constant-volume or the variable-volume type of system.

The pumps may be of various types, including the piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

Formulated functional fluids can be prepared by employing compositions of this invention in admixture with selected additives which are added in minor proportions to enhance a desirable characteristic or to suppress an undesirable characteristic. Such additives generally include corrosion inhibitors or hydrolytic stabilizers such as dibromobenzene, chlorinated biphenyl, alkylated thiophene, triphenylthioether, iodobiphenyl and the like. Such additives can be employed in concentrations of from about 0.01% to about 20% by weight in the functional fluids of this invention.

The compositions of this invention can also contain dyes, pour point depressants, antioxidants, viscosity index improvers, such as polyalkylacrylates and polyalkylmethacrylates, lubricity agents and the like.

Certain of the aryl dialkyl phosphinate esters of this invention are new and novel. Said esters can be represented by the structural formula

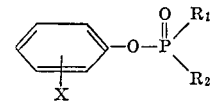

wherein $R_1$ and $R_2$ are each alkyl radicals having from 3 to 6 carbon atoms, X is selected from the group consisting of hydrogen, alkyl and alkoxy radicals having from 1 to 8 carbon atoms and the halogens. Aryl dialkyl phosphinate esters wherein the alkyl radicals contain more than 6 carbon atoms have been found to exhibit undesirable characteristics of functional fluids. It has been found, for example, that aryl diheptyl phosphinate and higher homologues of the compounds of structure III are not useful as base stocks for functional fluids. This lack of utility is attributed to the relatively high viscosity of the compounds at normal room temperatures and below. In fact the viscosity of these compounds is such that hydraulic systems containing them as the operative fluid would be inoperative at low temperatures, i.e., 70° F.

Such hydraulic systems would be operative only at elevated temperatures when the operative fluid is, for example, phenyl-di-n-octyl phosphinate which is a solid at room temperature. It has also been found that aryl dialkyl phosphinate esters wherein the alkyl radicals contain less than three carbon atoms exhibilt undesirable characteristics of functional fluids in that such compounds are highly corrosive to ferrous metals and aluminum. Thus, when the number of carbon atoms in the alkyl portion of the ester is below three, the degree of corrosiveness increases surprisingly to a prohibitive level for use as a functional fluid.

The embodiments of the invention in which an exclusive property or privilege is claimed are defined as follows:

We claim:

1. A compound represented by the structural formula

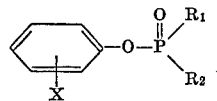

wherein $R_1$ and $R_2$ are each alkyl radicals having from 3 to 6 carbon atoms, X is selected from the group consisting of hydrogen, alkyl and alkoxy radicals having from 1 to 8 carbon atoms, and chlorine.
2. Phenyl-di-n-propyl phosphinate.
3. Phenyl-di-n-butyl phosphinate.
4. Phenyl-di-n-pentyl phosphinate.
5. Phenyl-di-n-hexyl phosphinate.
6. Cresyl-di-n-propyl phosphinate.
7. Tert-butylphenyl-di-n-butyl phosphinate.

References Cited
UNITED STATES PATENTS 2,629,693 2/1953 Barton et al.
3,287,275 11/1966 Seil.

CHARLES B. PARKER, Primary Examiner

A. H. SUTTO, Assistant Examiner

U.S. Cl. X.R.

260—951, 968; 252—78